July 21, 1936.    E. J. ABBOTT ET AL    2,048,154
APPARATUS FOR DETERMINING ROUGHNESS OF SURFACES
Filed May 27, 1935
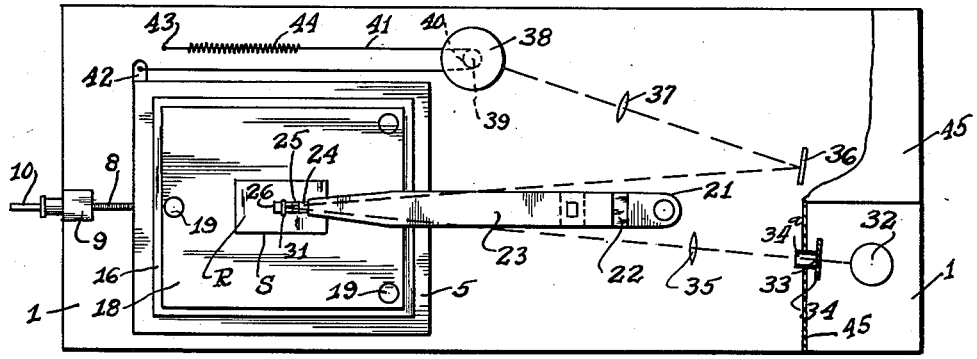
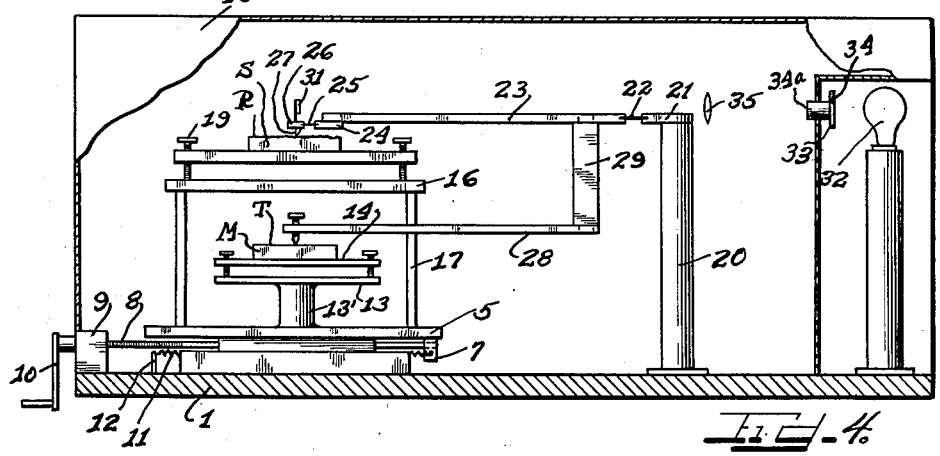
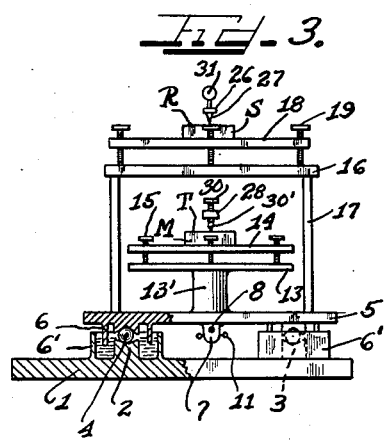
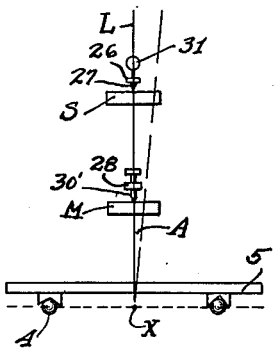
Inventors
Ernest J. Abbott.
Floyd A. Firestone.
by Charles W. Hills Attys.

Patented July 21, 1936

2,048,154

UNITED STATES PATENT OFFICE 2,048,154

APPARATUS FOR DETERMINING ROUGHNESS OF SURFACES

Ernest J. Abbott and Floyd A. Firestone, Ann Arbor, Mich.; said Floyd A. Firestone assignor to Regents of the University of Michigan, Ann Arbor, Mich., a corporation of Michigan Application May 27, 1935, Serial No. 23,546

12 Claims. (Cl. 73—51)

Our invention relates to apparatus which may be employed for detecting and indicating irregularities of surfaces, such, for instance, as small irregularities left by machining or similar operations, and which may also be employed for efficiently and accurately comparing a specimen surface with a true surface of the same nominal shape, with provisions for greatly magnifying and indicating the departure of the specimen surface from the true surface along lines traced simultaneously across like portions of the surfaces.

Our invention may be considered as an improvement over the apparatus and operation disclosed in Patent No. 1,976,337 issued October 9, 1934 to Floyd A. Firestone and Frank M. Durbin.

In the arrangement of the apparatus disclosed in the patent referred to the specimen to be checked and the master form having the surface with which comparison is to be made are mounted side by side on the shiftable carriage and with the specimen surface parallel with the true master surface, the tracer point engaging the specimen surface and the pilot point engaging the true surface being in a plane parallel with the plane of travel of the carriage.

Conditions might arise which would disturb the true movement of the carriage and under some of these conditions the accurate recording of the apparatus of the patent would not be disturbed. For example, if the guideways of the carriage became distorted so that the carriage experienced vertical movement of any spacing or height within the range of the instrument, these distortions clearly would not disturb the record as both the specimen surface and the master surface would be raised and lowered the same distance. Likewise, side sway of the carriage during travel thereof would not disturb the record. With the type of ways disclosed in the patent, only minute side sway movements would be possible and during such minute side sway the tracer point and the pilot point would merely swerve laterally and travel along a curved path rather than a perfectly straight line so that any effect on the record would be of negligible importance.

However, the arrangement disclosed in the patent referred to does not guard against tilting or canting motion of the carriage. For example, suppose that there is an error in the left way (Figure 3 of the patent) and that the carriage is raised a distance at this point. Geometric calculation will show that, even with a very slight tilt of the carriage, the difference in vertical movement of the tracer point and the pilot point will be sufficient to cause a material error in the record.

It is therefore an important object of our invention to accomplish the elimination of the effect of certain errors in the ways and movement of the carriage, and an essential feature is such relative location of the tracer point and the pilot point as will accomplish the end desired.

The ideal arrangement would be coincidence of the tracer point and the pilot point, but, since physical conditions preclude this, it is the purpose of our invention to provide practical and efficient means for eliminating the errors which have been found to be most disturbing. In accordance with our invention we arrange the tracer point and pilot point as closely together as possible but in a line which is perpendicular with the horizontal plane of travel which it is intended that the carriage shall maintain, and also to have the vertical line of the points pass as nearly as possible through the center of rotation of the extraneous or disturbing movements which might occur during the carriage travel. With our improved arrangement we have found it possible to entirely eliminate the appearance of such carriage travel errors in the record or to so reduce the effect of the errors as to be practically negligible.

The various features of our invention are incorporated in the structure disclosed on the accompanying drawing, in which drawing:

Figure 1 is a side elevation of the apparatus;

Figure 2 is a plan view thereof;

Figure 3 is an end view thereof with parts broken away to show the way construction;

Figure 4 diagrammatically illustrates the geometric relative arrangement of the point and the carriage.

The general arrangement of the apparatus parts is like that shown in the Firestone et al. patent referred to hereinbefore. The supporting base 1 has the rail flanges 2 and 3 projecting upwardly therefrom providing the V-shaped rail surfaces 3 for the balls 4 on which the carriage 5 is supported. One ball is provided on one rail and two balls on the other rail so that a three-point suspension is provided for the carriage. Plates or skirts 6 depend from the carriage into troughs 6' containing the sealing liquid such as oil in order to exclude dust and other foreign matter from the rail surfaces.

The carriage has a depending lug 7 in which is journaled the end of a shaft 8 whose outer end has screw threaded engagement in a block 9 and terminates in a crank handle 10.

Springs 11 connect with the lug 7 at opposite sides thereof and at their outer ends are anchored to posts 12, the springs serving to maintain engagement of the threaded shaft with the block 9 to prevent loose or lost motion of the shaft.

A supporting plate 13 is mounted on the carriage 5 as by a pedestal 13', the supporting plate being preferably substantially centrally located over the carriage. The supporting plate serves to support a leveling plate 14 on which is mounted the master form M having the true surface T with which comparison is to be made. By means of leveling screws 15 the plate 14 may be adjusted to bring the master surface into proper position.

Above the master form supporting structure is a mounting plate 16 which may be supported by legs 17 on the carriage bed and on this mounting plate is a leveling plate 18 adjustably supported by leveling screws 19. On this leveling plate is supported the specimen S whose surface R is to be compared with the surface on the master form M, the specimen being located directly above the master form, proper adjustment being made by means of the mounting screws so that the master and specimen surfaces T and R are parallel.

The tracer point and pilot point carrying structure is supported from a pillar 20 rising from the base 1. A block 21 mounted on the pillar is connected by a hinge strip 22 with the outer end of the arm 23 which extends substantially horizontally and is located laterally midway between the vertical planes of the carriage rails or ways. At its outer end the arm 23 supports a block 24 which is connected by a comparatively short hinge strip 25 with the tracer block 26 from which depends the tracer point 27, this tracer point engaging the specimen surface R which is to be checked.

The pilot arm 28 is vertically below the tracer arm 23 and parallel therewith and is secured at its inner end to a support 29 secured to and depending from the tracer arm. A contact screw 30 has adjustable engagement in the outer end of the pilot arm and has the spherical contact end 30' for engagement with the master surface T.

The tracer point and pilot point are in a line which is at all times substantially perpendicular to the normal plane of travel of the carriage, and with this line extending, as nearly as possible, through the center of rotation of extraneous or erroneous movements of the carriage. The specimen and master form supports are also arranged so that the points may be as closely together as possible.

The vertically disposed mirror 31 on the tracer block 26 receives horizontal light rays from a light source such as a lamp 32, the rays from the lamp passing through a slit 33 in the opaque member 34 and being focused onto the mirror 31 by a lens 35. The beam of light received by the mirror is reflected to a second mirror 36 which reflects the beam through a focusing lens 37 to a recording screen 38 in the form of a drum. This drum is rotatable on a shaft 39 on which is a pulley 40 around which travels a belt 41 one end of which is secured to the bracket 42 on the carriage 5 and the other end of which is anchored to a post 43, a spring or other elastic member 44 being included in the belt to keep it taut. As the carriage travels the master surface and specimen surface engage respectively with the pilot point and the tracer point and so long as the specimen surface matches the master or true surface there will be no movement of the tracer block relative to the tracer arm 23, but whenever the specimen surface digresses from the master surface the tracer block will swing on its hinge connection 25 and the light beam will be correspondingly deflected and the difference between the surfaces will be indicated on the screen. If a sensitized photographic surface is applied to the screen, the variations of the specimen surface from the master surface, throughout the range of exploraton of the specimen surface, will be graphed to a large magnification, and from this graphed record the nature of the specimen surface can be accurately determined.

To enclose and protect the apparatus, a cover or casing 45 is provided. In order to exclude extraneous light from the lamp 32 from reaching the screen 38, the lamp is mounted on the base 1 outside of the casing and the slit member 34 is also outside the casing with a light tight tube 34a extending therefrom into the casing through the adjacent wall thereof.

Briefly reviewing the procedure and operation, the master form and the specimen are placed on their supports 14 and 18 respectively and these supports adjusted and leveled by means of the leveling screws so that the master surface and the normal specimen surface will be in vertical alignment and parallel, and so that when the pilot point and tracer point engage at the centers of the respective surfaces the tracer arm and pilot arm will be horizontal. The carriage is then shifted by turning of the crank 10 for exploration of the specimen surface by the tracer point and for indication on the screen of any variation in the specimen surface from the master surface.

If the travel of the carriage is true throughout a test of a specimen surface, the variance of such surface from the true master surface will be accurately indicated on the screen. Referring now to certain inaccurate or erroneous movements of the carriage, if the movement is merely a slight vertical and uniform bodily motion of the carriage there will be no erroneous indication on the screen as both points will move the same vertical distance and there will be no relative movement of the points as they will remain on corresponding points of the respective surface.

Any extraneous movement of the carriage longitudinally on its ways will introduce no vertical errors as this is the primary motion of trace.

If the extraneous or faulty movement is in the nature of side sway of the carriage no material vertical errors will be introduced as such side sway merely causes the trace to be made over a curved path on the specimen rather than a perfectly straight line, and with the minute sideway movements possible with the type of ways used, the effects of such movements would be of negligible importance.

The extraneous movement of the carriage may be in the nature of tilting, but with the pilot and tracer points arranged in a line perpendicular to the carriage any effect of such movement would be negligible. Referring to Figure 4 the points are vertically spaced in the line L which is perpendicular to the carriage and extends through the longitudinal axis of the carriage and is perpendicular to the normal surface of the specimen. Suppose that the tilt is thru the point X in the line L and thru a small angle A. The master form and the specimen supported by the carriage will be carried a short distance through different arcs resulting in differential vertical movement of the points proportionate to the cosine of the angle A and the distances from the point X to the pilot point and tracer point respectively, but when the distance between the points is small and the angle of tilt is small, the relative vertical movement of the points approaches zero very closely and is therefore negligible.

If the axis of tilt or rotation of the carriage is outside of the line joining the points the resulting relative movement of the points is likewise negligible where the points are close together and where the angle of tilt is small as it would be for the way structure shown provided for the carriage.

The tracer point mounted on the hinge block 26 can rotate and thus move the mirror thereon during certain erroneous movements of the carriage so that our above analysis is strictly true only when the tracer point is in its nominal position with the hinge 25 straight. In practice the actual vertical movements of the tracer point with respect to the pilot point are small (of the order of .000100'' or less for smooth surfaces), which changes in the relative positions of the tracer and pilot points, under such erroneous operations of the carriage, are negligible when compared with their nominal spacings.

Due to small rotation of the point supporting structure about the hinge 22, the line joining the tracer and pilot points shifts slightly from its perpendicular relation to the specimen surface, but such movement is analogous to tilting movement of the carriage and its effect would be negligible.

From our analysis of the operation of the apparatus disclosed it is evident that by arranging the apparatus so that a line drawn from the center of the tracer point to the center of the pilot point is perpendicular to the surface being traced, and having this line pass as nearly as possible through the center of rotation of extraneous carriage movement, and then making the distance between points as small as possible, any errors due to movement of the carriage can be eliminated from the record or made so small as to be negligible.

We have shown and described a practical and efficient embodiment of the features of our invention, but do not desire to be limited to the exact construction, arrangement and operation shown and described as changes and modifications may be made without departing from the scope of the invention.

We claim as follows:

1. In apparatus for the purpose described, guideways and a carriage movable thereon and adapted for mounting a master surface form and a specimen whose surface is to be compared with the master surface, said specimen and form being vertically aligned, a support having a tracer point and a pilot point thereon for engaging the specimen surface and master surface respectively, said points being located in a line perpendicular to the plane of travel of said carriage, and being arranged to follow the vertical profiles of said surfaces and to move relatively to indicate differences in such profiles.

2. In apparatus for the purpose described, guideways and a carriage movable thereon and adapted for mounting a master surface form and a specimen whose surface is to be compared with the master surface, said specimen and form being vertically aligned, a support having a tracer point and a pilot point thereon for engaging the specimen surface and master surface respectively, said points being located in a line perpendicular to the surfaces being compared during normal travel of said carriage, and being arranged to follow the vertical profiles of said surfaces and to move relatively to indicate differences in such profiles.

3. In apparatus for the purpose described, a horizontally movable carriage, a tracer point and a pilot point supported to be held by gravity in engagement respectively with the surface of a specimen and the surface of a master form supported on said carriage, said points being vertically aligned and relatively movable by differences in the profiles of said surfaces.

4. In apparatus for the purpose described, a horizontally movable carriage, a tracer point and a pilot point for engaging respectively with the surface of a specimen and the surface of a master form supported on said carriage, said points being vertically aligned, said tracer point being arranged for vertical oscillation relative to said pilot point, an indicator, a mirror mounted on said tracer point in position to reflect a beam of light to said indicator whereby to indicate variance of the specimen surface from the master surface.

5. In apparatus for determining the surface roughness of an object by comparison with the true surface of a master form, a support, an arm flexibly mounted at one end thereon, a second arm flexibly mounted on the free end of the first arm and having a contact element for engaging the surface of the object, a pilot contact element supported from said first mentioned arm for contacting with the surface of the master form, said contact elements being located in a line perpendicular to the engaged surfaces.

6. Apparatus for determining the surface roughness of an object comprising a support, an arm hinged thereto, a block member hinged to said arm and having a contact element for engaging the surface of an object, and a second contact element extending from said arm for engaging the true surface of a master form, said contact elements being located in a line perpendicular to the engaged surfaces.

7. In apparatus for the purpose described, a carriage movable in a fixed path, adjustable supports on said carriage for a master form and a specimen whose surfaces are to be compared, an arm structure movable in a plane at right angles with the path of the carriage, a pilot point fixed on said arm structure for engaging the master form surface and a tracer point supported by said arm structure for movement to follow the surface of the specimen, said points being located in a line parallel to the plane of movement of said arm structure.

8. In apparatus for the purpose described, a carriage movable in a fixed path, adjustable supports on said carriage for a master form and a specimen whose surfaces are to be compared, an arm structure movable in a plane at right angles with the path of the carriage, a pilot point fixed on said arm structure for engaging the master form surface and a tracer point supported by said arm structure for movement to follow the surface of the specimen, said points being located in a line parallel to the plane of movement of said arm structure, and recording means for magnifying and indicating the relative movements of said points.

9. In apparatus for the purpose described, a carriage supported to move in a predetermined plane; means for supporting a master form and a specimen on said carriage in vertical alignment, a pilot point and a tracer point supported to be held by gravity for engagement with and to follow the surfaces of the master form and specimen respectively as the carriage travels, said points being close together and located in a line perpendicular to the plane of travel of the carriage.

10. In apparatus for the purpose described, a carriage movable in a predetermined plane, means for supporting a master form and a specimen on said carriage in vertical alignment, a pilot point and a tracer point supported to be held by gravity to engage with and follow the surfaces of the master form and specimen respectively as the carriage travels, said points being located in a line perpendicular to the plane of travel of the carriage and in a plane extending through the longitudinal axis of the carriage.

11. In apparatus for the purpose described, a carriage supported for movement in a predetermined plane, supports on said carriage for supporting a master form and a specimen in vertical alignment, a pilot point and a tracer point supported to be held by gravity for engagement with and to follow the surfaces of the master form and specimen respectively as the carriage travels, said points being close together and located in a line perpendicular to the surface being traced and passing as nearly as possible through the center of extraneous movement of said carriage.

12. In apparatus for the purpose described, a mounting support for mounting a master surface form and a specimen whose surface is to be compared with the master surface, a second support, a frame hinged at one end on said second support and a pilot point on said frame, a tracer point having hinge connection with the other end of said frame for movement independently thereof, said supports being adapted for relative movement in a predetermined plane and said points being located in a line perpendicular to the plane of relative movement and in engagement respectively with the master surface and specimen surface during such relative movement whereby to follow the profiles of said surfaces and indicate differences in such profiles.

ERNEST J. ABBOTT.
FLOYD A. FIRESTONE.